(12) United States Patent
Zhong

(10) Patent No.: US 11,120,704 B2
(45) Date of Patent: Sep. 14, 2021

(54) WRITING IMPLEMENT

(71) Applicant: XIAMEN ZHI HUI QUAN TECHNOLOGY CO. LTD, Fujian (CN)

(72) Inventor: Ji-Li Zhong, Fujian (CN)

(73) Assignee: XIAMEN ZHI HUI QUAN TECHNOLOGY CO. LTD

(\*) Notice: Subject to any disclaimer, the term of this patent is extended or adjusted under 35 U.S.C. 154(b) by 149 days.

(21) Appl. No.: 16/624,731

(22) PCT Filed: Jun. 13, 2018

(86) PCT No.: PCT/CN2018/091157
§ 371 (c)(1),
(2) Date: Mar. 3, 2020

(87) PCT Pub. No.: WO2018/233532
PCT Pub. Date: Dec. 27, 2018

(65) Prior Publication Data
US 2020/0202741 A1    Jun. 25, 2020

(30) Foreign Application Priority Data

Jun. 22, 2017 (CN) .......................... 201710479177.8

(51) Int. Cl.
*G09B 11/00* (2006.01)
*B43K 5/00* (2006.01)
(Continued)

(52) U.S. Cl.
CPC .............. *G09B 11/00* (2013.01); *B43K 5/005* (2013.01); *B43K 29/08* (2013.01); *G06F 3/03545* (2013.01)

(58) Field of Classification Search
CPC ........ B43K 5/005; B43K 29/08; B43K 7/005; B43K 8/003; B43K 29/00; B43K 29/003;
(Continued)

(56) References Cited

U.S. PATENT DOCUMENTS 6,422,775 B1\* 7/2002 Bramlett ................ B43K 29/08
382/188
6,454,482 B1\* 9/2002 Silverbrook ............... B41J 3/36
401/195
(Continued)

FOREIGN PATENT DOCUMENTS

CN           102067153 A         5/2011

*Primary Examiner* — David J Walczak
(74) *Attorney, Agent, or Firm* — Innovation Counsel LLP

(57) ABSTRACT

A writing implement, including a pen tube, a guiding element, a motion sensor, and a controller. An end portion of the pen tube is provided with a nib. The guiding element and the motion sensor are disposed on the pen tube, and the guiding element is controlled by the controller. In the process of writing, the motion sensor detects words and pencraft characteristics when a user holds the pen tube for writing, and the controller controls the guiding element to generate a guiding force to guide the words and pencraft characteristics when writing, to approach or be equal to words and pencraft characteristics prepared to be written. Therefore, the present invention may train a user to copy the handwriting of a master or actively guide the user to wield the pen by means of the writing implement.

18 Claims, 14 Drawing Sheets

(51) Int. Cl.
*B43K 29/08* (2006.01)
*G06F 3/0354* (2013.01)

(58) Field of Classification Search
CPC ...... B43K 29/007; G09B 11/00; G09B 11/08; G06F 3/03545; G06F 3/03546; G06F 3/0362
USPC .................. 401/195, 52, 193, 194; 347/109; 345/156, 179, 184; 178/18.01, 18.02, 178/18.06, 19.04
See application file for complete search history.

(56) References Cited

U.S. PATENT DOCUMENTS

| | | | |
|---|---|---|---|
| 6,550,997 B1* | 4/2003 | King | B41J 3/36 |
| | | | 178/79 |
| 7,794,167 B2* | 9/2010 | Lapstun | G01L 1/26 |
| | | | 401/195 |

* cited by examiner

WRITING IMPLEMENT

This application is the 35 U.S.C. § 371 national stage of PCT application PCT/CN2018/091157, filed Jun. 13, 2018, which claims the benefit of People's Republic of China application serial no. 201710479177.8, filed on Jun. 22, 2017, the disclosure of which is hereby incorporated by reference.

BACKGROUND OF THE INVENTION

Field of the Invention

The present invention relates to a writing implement, and more particular to a writing implement for pen-wielding training, copying or writing guiding.

Description of the Related Art

Hand writing is an important part of Chinese culture. In learning hand writing, the beginners need to learn wielding the pen and basic pencraft, and then learn how to control the strength of writing and the thickness of strokes by means of copying. Especially in terms of the structure of the words and aesthetics, the pencraft of each family has its own unique style. Without hard working and copying, it is difficult to learn good hand writing.

However, there is no writing implement with copying or learning functions on the market currently. Therefore, it is important to develop a writing implement for learning the pencraft of each family by pen-holding training, copying, or actively guided writing, to quickly grasp the main points of writing.

SUMMARY OF THE INVENTION

The purpose of the present invention is to provide a writing implement, which can learn the pencraft of the master by pen-holding training, copying, or actively guided writing.

According to an embodiment of the present invention, a writing implement is provided. The writing implement includes a pen tube, a guiding element, a motion sensor, and a controller. An end portion of the pen tube is provided with a nib; the guiding element and the motion sensor are disposed on the pen tube, the guiding element is controlled by the controller. In the process of writing, the motion sensor detects words and pencraft characteristics when a user holds the pen tube for writing, and transmits the words and pencraft characteristics to the controller. The controller performs a comparative analysis between the words and pencraft characteristics prepared to be written and the words and pencraft characteristics when writing according to the words and pencraft characteristics prepared to be written. When the words and pencraft characteristics prepared to be written are different from the words and pencraft characteristics when writing, the controller controls the guiding element to generate a guiding force to guide the words and pencraft characteristics when writing, to approach or be equal to the words and pencraft characteristics prepared to be written.

Therefore, the present invention may train a user to copy the handwriting of a master or actively guide the user to wield the pen by means of the writing implement, so as to guide the user to write words and pencraft characteristics corresponding to words and pencraft characteristics prepared to be written, and thereby increase public interest in hand writing and motivation for the public to write Chinese words.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
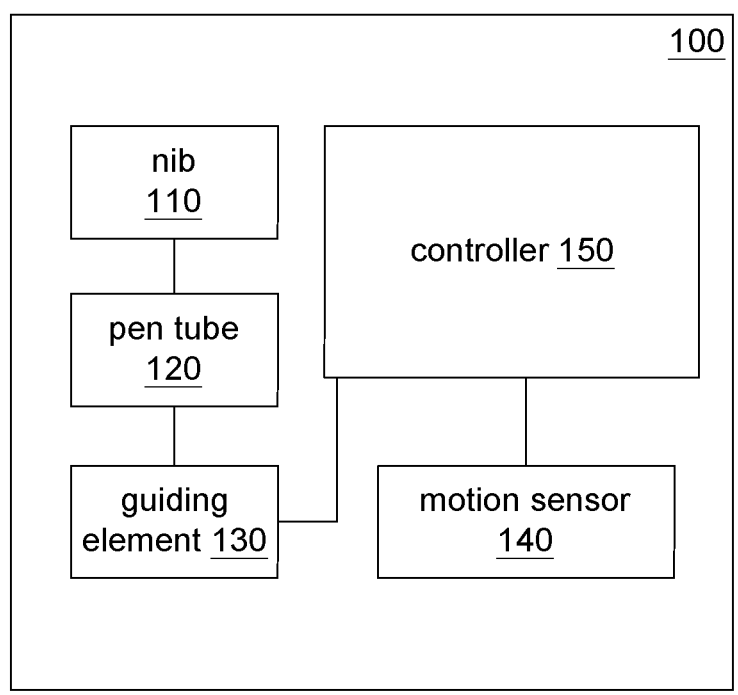
FIG. 1 shows a block diagram of a writing implement according to an embodiment of the present invention.

Herein, some embodiments of the present invention are described in detail with reference to the accompanying drawings, but not all embodiments are shown in the drawings. In fact, these inventions may have many different variations, and are not limited to the embodiments herein. In contrast, these embodiments are provided in the present invention to meet the legal requirements of the application. The same reference symbols in the figures are used to indicate the same or similar elements.

Referring to FIG. 1, the writing implement 100 includes a nib 110, a pen tube 120, a guiding element 130, a motion sensor 140, and a controller 150. The controller 150 is, for example, a driving unit, an analyzing unit, a data storage unit, and the like composed of an integrated circuit, hardware, and/or an application. The driving unit controls the guiding element 130 and is disposed on the pen tube 120. The analysis unit performs a comparative analysis between the words and pencraft characteristics prepared to be written, and the words and pencraft characteristics during writing. The analysis unit is provided on a mobile phone, computer, or data cloud, and performs data calculation wirelessly, or is provided on the pen tube 120. The data storage unit, such as a memory, is used to store copybook data, words, and pencraft characteristics of the masters.

In the process of writing, the motion sensor 140 detects the words and pencraft characteristics when the user holds the pen tube 120 to write, and transmits a signal of detecting the words and pencraft characteristics to the controller 150. The controller 150 performs a comparative analysis between the words and pencraft characteristics prepared to be written, and the words and pencraft characteristics during writing, according to the words and pencraft characteristics prepared to be written by the user. When there is a difference between the words and pencraft characteristics prepared to be written and the words and pencraft characteristics during writing, the controller 150 controls the guiding element 130 to generate a guiding force to guide the words and pencraft characteristics when writing, to approach or be equal to the words and pencraft characteristics prepared to be written.

Figure 2A:
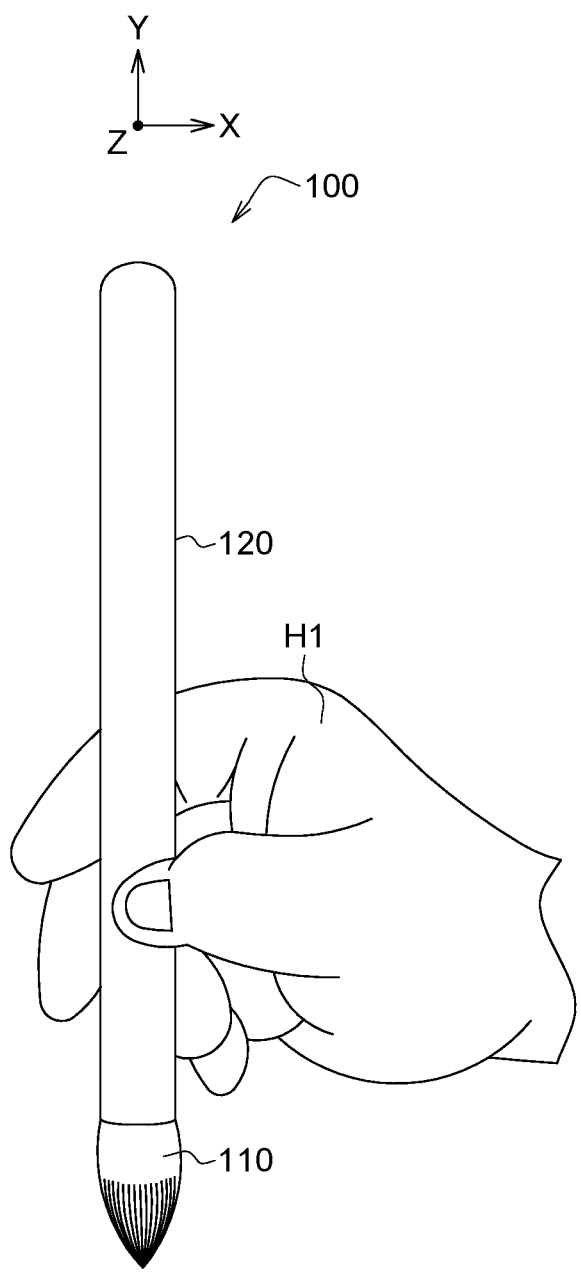
FIG. 2A shows a schematic diagram of a user holding a writing implement with hand.
Figure 2B:
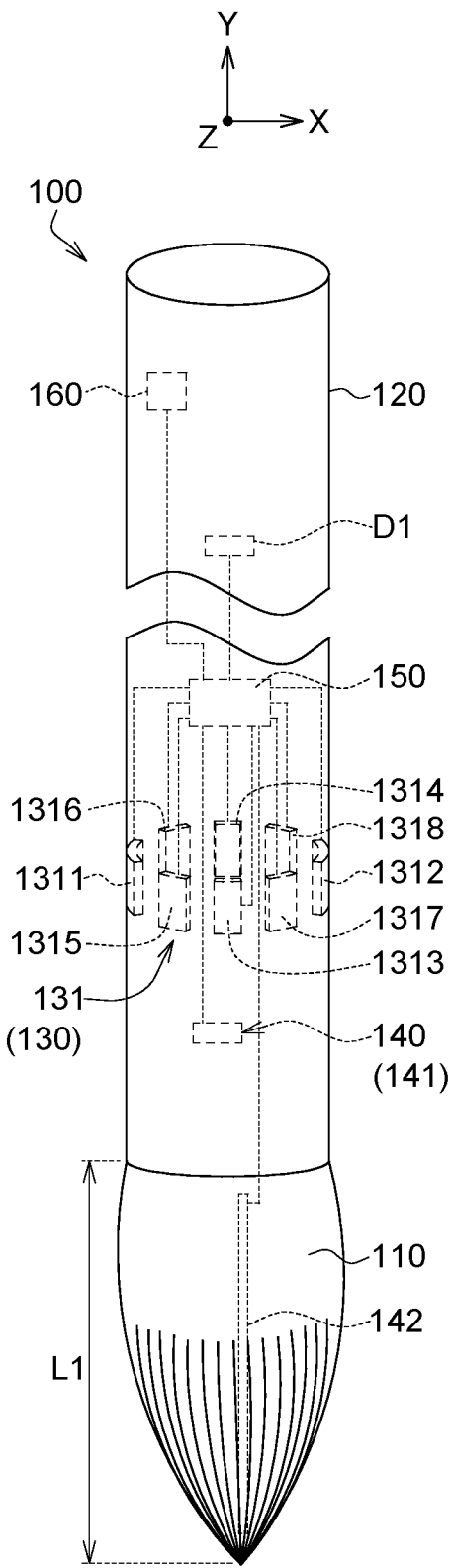
FIG. 2B shows an internal schematic diagram of the writing implement of FIG. 2A.

Referring to FIGS. 2A and 2B, the nib 110 is mounted at the end portion of the pen tube 120, and the guiding element 130 is provided inside or outside the pen tube 120. The guiding element 130 may generate a guiding force for displacing the pen tube 120 by the actuation, mechanical force rotation, or movement of a motor or micro-electromechanical. In addition, the controller 150 may also transmit signals to an external device, and receive signals inputted from the external device (not shown) through the signal transmitter 160. The external device is, for example, computer units such as a computer, a mobile phone, or a mobile tablet. Therefore, the number of elements which needs to be disposed in the pen tube 120 can be reduced, to reduce the weight of the writing implement and improve the analyzing velocity and accuracy. In an embodiment, the motion sensor 140, such as a gyroscope, a G-sensor, or other suitable sensor that detects the displacement amount, orientation angle, and/or velocity of the writing implement 100, is provided on the pen tube 120. The motion sensor 140 can detect the displacement, orientation angle, and/or moving velocity of the writing implement 100 in one axis, two axes, or three axes of the X, Y, and Z-axis, to generate the displacement signal, angular displacement signal, and/or angular velocity signal, etc., in the corresponding axis in real time. In addition, the motion sensor 140 may further include a nib pressure sensor 142 provided in the nib 110. The nib pressure sensor 142 is, for example, a piezoelectric transduction element.

In an embodiment, the nib 110 may be a soft material such as hair, plastic, or rubber, but the present invention is not limited thereto. The nib can be stained with ink, and the nib generally has a conic shape with a wide upper width and a narrow lower width. In an embodiment, the writing implement 100 further includes an ink cartridge, which can be configured in the pen tube 120 for refilling ink to the nib 110.

Figure 2C:
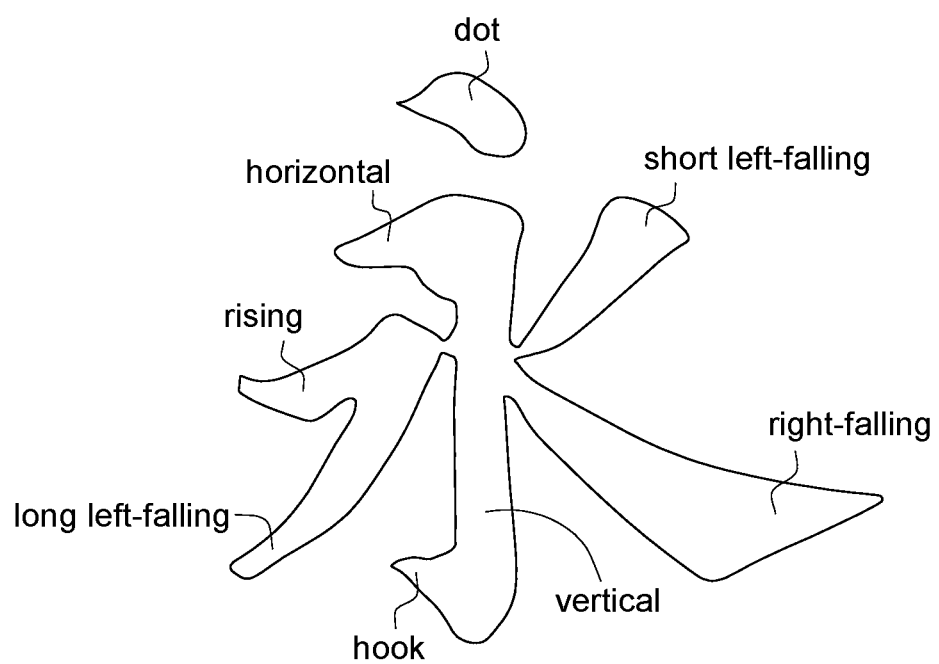
FIG. 2C shows a schematic diagram of a basic pencraft stored in a copybook data storage unit.

In an embodiment, the user may press the nib 110 to generate a deformation on the tip of the nib 110, and drive the pen tube 120 to move in a predetermined direction. Then, the user may perform a practice of pen-wielding and basic pencraft on the paper. In an embodiment, the writing implement 100 can detect the deformation amount of the nib 110 after being pressed through the pressure sensor 142, and detect the direction of the movement of the nib 110 when wielding the pen through the motion sensor 140 (or the displacement sensor 141), to find out the pencraft or words the user desires to write. For example, in FIG. 2C, when writing the "dot" pencraft in the Eight Principles of Yong, the nib is first slightly pressed down, and then the range is gradually extended to the lower right side, and at last the pen is paused and lifted. When writing the "short left-falling" pencraft in the Eight Principles of Yong, the nib is fully pressed down, and then skimmed to the lower left side, and then the end the stroke. Other pencraft such as "horizontal", "vertical", "hook", "rising", "long left-falling", and "right-falling" in the Eight Principles of Yong also have corresponding deformation amount and moving direction of the nib, which are not repeated here.

In addition to the practice of pen-wielding and basic pencraft, the writing implement of the present embodiment can also determine the words and pencraft the user desires to write based on the words stored in the copybook data storage unit D1. The words stored in the copybook data storage unit D1 are, for example, the hand writing words and their pencraft characteristics of the masters, such as the hand writing and their pencraft characteristics of masters like Yan Zhenqing and Liu Gongquan. However, the words stored in the copybook data storage unit D1 are not limited to must be Chinese characters, and can also be words or symbols other than Chinese characters. In addition, the copybook data storage unit D1 can also store the pencraft characteristics of the masters, particularly the characteristics at the middle or the end of the pencraft of the masters, so that the controller 150 can control the guiding element 130 to generate guidance according to the characteristics at the middle or end of the pencraft.

Therefore, the user can select the words and pencraft characteristics prepared to be written from the copybook data storage unit D1, or the controller 150 can detect the words and pencraft characteristics when writing according to the motion sensor 140, and perform comparison with the words and pencraft characteristics stored in the copybook data storage unit D1. After the comparison, the user confirms the words and pencraft characteristics prepared to be written, or according to the real time analysis of the words and pencraft characteristics detected by the controller according to the motion sensor 140, and after performing the real time comparison with the words and pencraft characteristics stored in the copy data storage unit D1, the words and pencraft characteristics prepared to be written are automatically determined.

Referring to FIG. 2B, the controller 150 may search for the pencraft corresponding to the words the user desire to write in the copybook data storage unit D1, according to the signal outputted from the nib pressure sensor 142 and/or the displacement sensor 141. After that, the controller 150 then controls the guiding element 130 to generate an actuation, a deviation or a displacement, to guide a hand H1 to wield the pen toward a predetermined direction. The above-mentioned actuation or displacement generated for guidance is not limited to one time or more times, and it depends on the user's situation of pen-wielding. If the user's displacement movement of the pen-wielding is insufficient, the power of beginning the writing is insufficient, or the proper pencraft characteristics are not grasped, the guiding element 130 can generate the guidance again as appropriate.

The guiding element 130 may be guided by a force required for generating displacement of a motor, a hydraulic cylinder, a micro-electromechanical, a gear, a push rod, or a combination of at least two of the above elements. The following describes embodiments of different types of actuators that generate torque, but the present invention is not limited thereto. The writing implement of the present invention may also be used by combining or mixing the following embodiments, for example, in FIGS. 3A to 3E, the force generated by the actuator 131 may be a guidance corresponding to a smaller pencraft characteristics, and the force generated by the actuator 231 or 331 in FIGS. 10A-10B and FIGS. 13A-13B may be a guidance corresponding to a larger pencraft characteristics.

Referring to FIG. 2B, the guiding element 130 includes multiple actuators 131, which are disposed inside the pen tube 120, but can also be disposed outside the pen tube 120. The actuator 131 is controlled by the controller 150. In an embodiment, the actuator 131 includes a first actuator 1311, a second actuator 1312, a third actuator 1313, a fourth actuator 1314, a fifth actuator 1315, a sixth actuator 1316, a seventh actuator 1317, and an eighth actuator 1318. In the present embodiment, the number of the actuators 131 is described by taking eight as an example, but the actuators may also be less than four or more than eight, such as sixteen actuators. When the number of actuators 131 is larger, the sensitivity of the guidance is higher.

In an embodiment, the actuator 131 is for example an eccentric motor, or an electromagnetic induction actuation element, etc. Wherein when the eccentric motor is rotated with the eccentric wheel, the mass point is not on the rotation axis, and thereby an actuation is generated. When multiple eccentric motors are disposed in different orientations, the pen tube is promoted to be moved toward the direction of the guiding force, or the pen tube is suppressed to be moved toward the direction of non-guiding force, by the net component force generated on the different orientation. For details, please refer to the description below, and the description of FIGS. 3A to 3E and FIGS. 8A and 8B. In addition, the electromagnetic induction actuation element generates actuation force by changing the magnetic force. When multiple electromagnetic induction actuation elements are disposed in different orientations, the nib is guided or prompted toward the guiding direction to write by the net component force generated in the different orientation.

In addition, if the user makes a writing mistake without grasping the essentials of writing, and causes the nib 110 not moving in the direction of the guiding force, the user may further be reminded by the suppressing force generated by the actuator 131. At this time, the user can perceive the resistance force generated by the actuator 131 when the writing error occurs, and then correct the writing direction or pencraft, and write in the correct guiding direction.

In another embodiment, the above-mentioned actuator 131 may include using a flywheel to generate a guiding force. For example, the actuator 131 includes a flywheel provided on the pen tube 120. When the nib 110 is not moved in the direction toward the guiding force, the inertial torque of the flywheel is used to generate a resistance force opposite to the wrong writing direction, so that the user can perceive the resistance force, and then correct the writing direction or pencraft. In addition, the flywheel can also be used as an assistance power for guiding the nib 110 forward and to move toward the direction of the guiding force.

In an embodiment, the first actuator 1311 and the second actuator 1312 in FIG. 2B are, for example, arranged along the X-axis, which respectively guide the user to displace to the left or to displace to the right, or generate a X-axis-related guidance in any pencraft. Referring to the action principle of FIG. 3A to FIG. 3C and FIG. 8A and FIG. 8B, when the user gently holds the pen tube 120, the two actuators 131 are actuated instantly (for example, the hydraulic cylinder 132 drives the piston 133 up and down) and hit the upper plate 121 and the lower plate 122 respectively. At this time, the pen tube 120 is driven by the rotation torque in the X-axis and generates a tilt or displacement, so that the nib 110 can be controlled to write pencraft characteristics related to the guidance in the X-axis, which includes guiding the user to write pencraft characteristics such as the middle or end of the "horizontal" pencraft in the Eight Principles of Yong, or other pencraft characteristics that are related to the guidance in the X-axis. In addition, an embodiment of three actuators 131 is shown in FIG. 4, in which two actuators 131 generate more varied and combined forces on one side, and the other actuator 131 is on the other side. The actuators 131 may also be three, five, or seven actuators in different orientations, and are not limited to an even number.

In addition, the third actuator 1313 and the fourth actuator 1314 in FIG. 2B are, for example, arranged along the Z-axis, which respectively guide the displacement toward the −Z-axis direction or the +Z-axis direction, or generate guidance related to the Z-axis displacement in any pencraft. Referring to the action principle of FIG. 3A to FIG. 3C and FIG. 8A and FIG. 8B, when the user gently holds the pen tube 120, the two actuators 131 are actuated instantly and hit the upper plate 121 and the lower plate 122 respectively. At this time, the pen tube 120 is driven by the rotation torque in the Z-axis and generates a tilt or displacement, so that the nib 110 can be controlled to write pencraft characteristics related to the Z-axis, which includes guiding or prompting the user to write pencraft characteristics such as the middle or end of the "vertical" pencraft in the Eight Principles of Yong, or other pencraft characteristics that are related to the guidance in the Z-axis.

In addition, any one of the remaining fifth actuator 1315, sixth actuator 1316, seventh actuator 1317, and eighth actuator 1318 in FIG. 2B may be located between adjacent two of the first actuator 1311, the second actuators 1312, the third actuator 1313, and the fourth actuator 1314. For the action principle, referring to FIG. 3A to FIG. 3C and FIG. 8A and FIG. 8B, the nib can be controlled to write pencraft characteristics related to the corresponding axis (such as 45 degrees, 135 degrees, 225 degrees, and 315 degrees), which includes be guided to write pencraft characteristics such as the middle or end of the "dot", "hook", "rising", "long left-falling", "short left-falling", and "right-falling" in the Eight Principles of Yong.

Figure 3A:
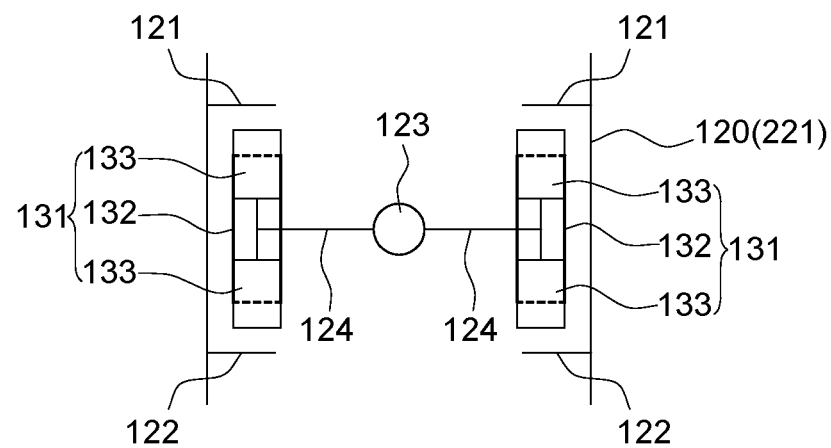
FIGS. 3A to 3C show schematic diagrams of generating a guiding element for guiding writing by a rotation torque.
Figure 3B:
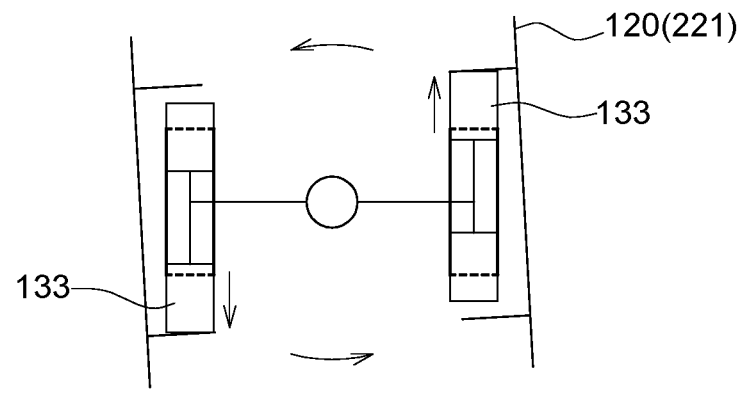
Figure 3C:
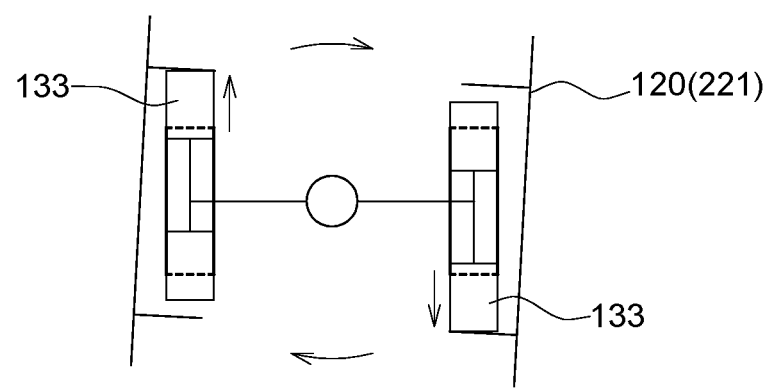
Figure 4:
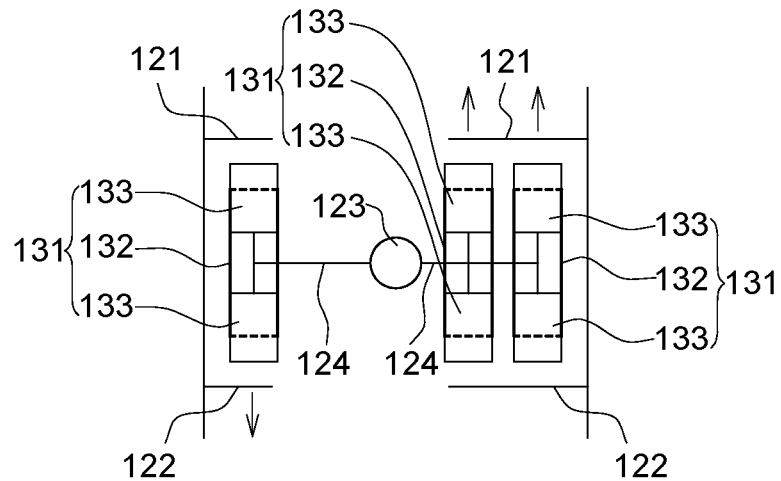
FIG. 4 shows a schematic diagram of another guiding element.

In FIGS. 3A to 3C, the central axis 123 is provided in the pen tube 120 and can be connected between the two actuators 131 by two connecting rods 124, so that the actuator 131 is maintained in a horizontal position when it is not actuated. The actuator 131 generates a guiding force, for example, by means of driving the piston 133 by electromagnetic induction, hydraulic pressure, or pneumatic pressure. Each piston 133 can be moved toward the upper plate 121 or the lower plate 122 via a valve control, respectively, to hit the upper plate 121 or the lower plate 122, so that a guiding force for rotating the pen tube 120 with respect to the central axis 123 can be generated.

Figure 3D:
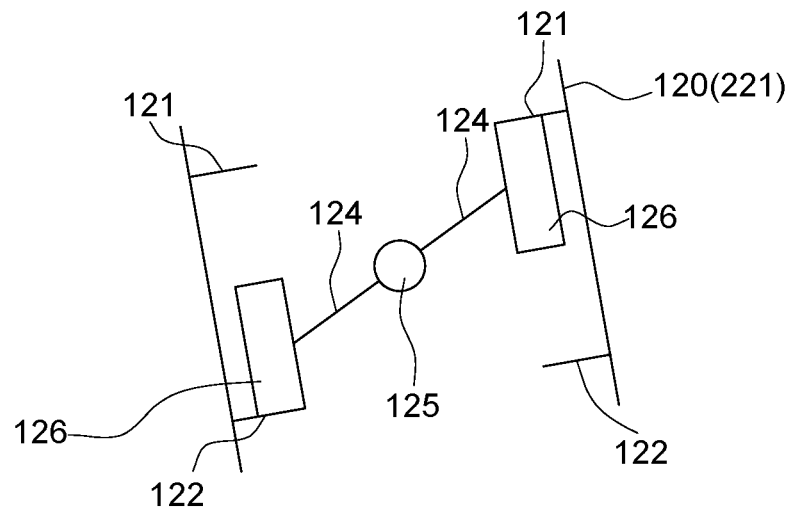
FIGS. 3D to 3E show other schematic diagrams of generating a guiding element for guiding writing by a rotation torque.
Figure 3E:
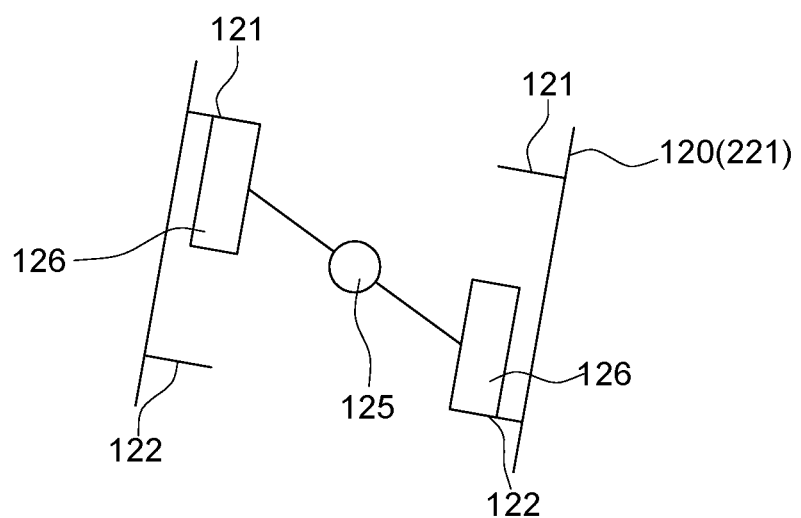
Figure 5:
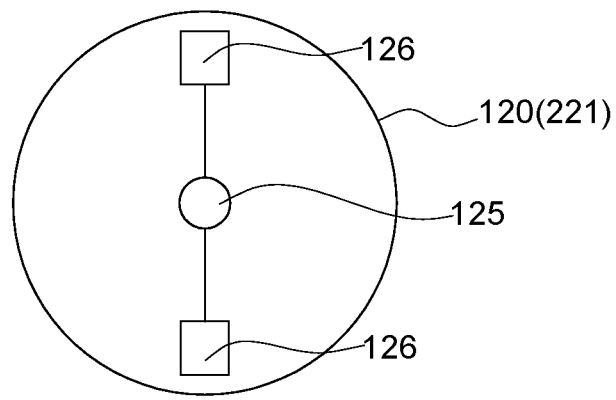
FIG. 5 shows a schematic top view of a guiding element configured with an even number of counter weights.
Figure 6:
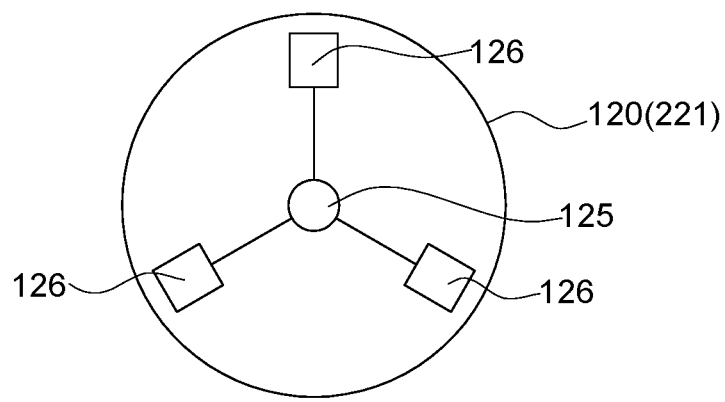
FIG. 6 is a schematic top view of a guiding element configured with an odd number of counter weights.

In addition, referring to FIG. 3D and FIG. 3E, the guiding force mentioned above can also be generated by a servo motor 125 and two eccentric counter weights 126. That is, the servo motor 125 is located on the central axis, and the counter weight 126 is connected to the servo motor 125 by the connecting rods 124. The servo motor 125 drives the counter weight 126 to generate a guiding force (including a rotation torque), so as to control the nib to write pencraft characteristics related to the corresponding axis. In addition, embodiments of two and three counter weights 126 are shown in FIGS. 5 and 6. That is, the counter weight 126 may also be three, five, or seven actuators in different orientations, and are not limited to an even number.

In the process of continuous writing, the controller 150 can also continuously analyze that the pencraft in which word or the pencraft of which master is written by the nib 110. In an embodiment, when the user already has a copy experience of the pencraft of each family, the writing implement of the present embodiment may also guide or prompt the user to start copying the pencraft characteristics of the masters when writing in the middle or end of the pencraft of each family, to show the master's style.

Taking the word "yong" as an example, after the nib 110 writes the "dot" pencraft, the motion sensor 140 detects the displacement amount from the upper left to the lower right, and the controller 150 analyzes from the copybook data storage unit D1 that the nib may be writing the words such as "yong(永)", "yu(于)", "bao(玊)", and "she(社)" (transliteration of simplified Chinese) which has the "dot" pencraft. After that, after the nib 110 writes the "horizontal" pencraft, the motion sensor 140 detects the displacement amount from the left to the right, and the controller 150 excludes the word "bao" from the words "yu", "bao", and "she". After that, when the motion sensor 140 detects that the "horizontal" pencraft stops below the position of the "dot" pencraft and starts to move downwardly, the controller 150 excludes the word "yu" and the word "she" from the words "yong", "yu" and "she", and therefore the controller 150 confirms that the nib 110 is writing the word "yong". After that, the controller 150 can perform the guidance of the pencraft characteristics of the master according to the subsequent middle or later pencraft. If the user does not write according to the direction of the guidance, the controller 150 can also correct the writing direction according to the difference between the words and pencraft characteristics prepared to be written and when writing, to guide the writing toward the correct guiding direction.

To sum up, in the process of writing of the nib 110, in addition to analyzing the strokes and/or pen-wielding sequence of the nib 110, the controller 150 can also control the actuators 131 located in different orientations, to sequentially generate displacement or deviation, so as to guide or prompt the nib 110 to write the pencraft characteristics corresponding to the guidance direction.

In another writing method, the signal transmitter 160 is, for example, a voice inputting device, which can receive a voice representing the word to be written. The controller 150 analyzes the voice to obtain the word prepared to be written, and then perform the guidance. For example, the user can speak "yong" to the writing implement 100, and after the analysis, the controller 150 learns that the word which the user prepares to write is "yong". After that, the controller 150 controls the guiding element 130, and on the first stroke (when beginning the writing), the user may be continuously guided to wield the pen without analyzing the words and pencraft characteristics to be written in advance.

In another writing method, the signal transmitter 160 is, for example, a wireless communication module, which can receive or transmit a wireless signal of an external device, wherein the external device is an electronic device such as a mobile phone or a computer. The user may transmit a signal representing the word (such as the word "yong") prepared to be written, to the writing implement 100 through the external device. The signal transmitter 160 can transmit the signal to the controller 150 after receiving the signal, and the controller 150 controls the guiding element 130 according to the signal. On the first stroke (when beginning the writing), the user may be continuously guided to wield the pen without analyzing the words and pencraft characteristics prepared to be written in advance.

In another writing method, the user can use the writing implement 100 to write the word prepared to be written one or more times, such as the word "yong". The controller 150 analyzes the word prepared to be written, and learns that the word prepared to be written is the word "yong", and then controls the guiding element 130 according to the word, to continuously guide the user to wield the pen on the first stroke (when beginning the writing). Before the user is guided to wield the pen, the writing implement 100 may transmit an analysis result to an external device through the signal transmitter 160 (such as a wireless communication module), so that the user can confirm whether the analysis is correct. After the user to return a signal of correct analysis, the writing implement 100 guides the user to wield the pen.

Although the above embodiment takes the word "yong" as an example, the method of writing and guiding other any words may be similar to the word "yong", and will not be repeated here. Further, in addition to the voice input, the wireless signal input, and the handwriting input, the writing implement 100 of the present embodiment can also use the fuzzy theory technology for performing analysis. That is, according to the words and pencraft characteristics during writing, and the habitual vocabulary relationship formed by the written words, the writing implement 100 performs judgment in real time, and so as to guide or prompt the user to wield the pen.

Figure 7A:
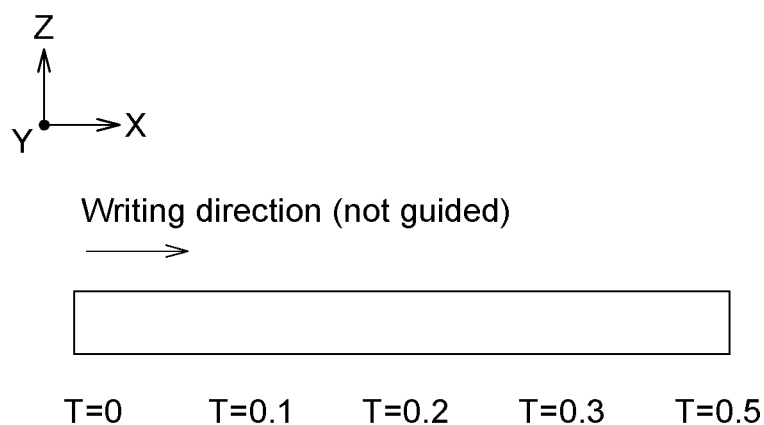
FIGS. 7A and 7B respectively shows a comparison between when the pen tube is not guided and when the pen tube is guided in the process of writing the word "yi(—)".
Figure 7B:
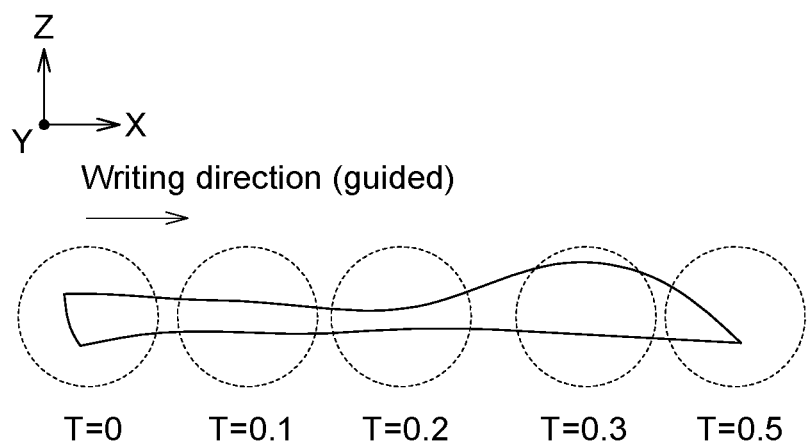

Referring to FIG. 7A and FIG. 7B, in the process of writing, the horizontal pencraft "yi(—)" (transliteration of simplified Chinese) written without guidance has no change in thickness. In contrast, the horizontal pencraft "yi" written with guidance not only has change in thickness, but also has the lightness and heaviness when beginning of the writing and obvious characteristics. The two pencrafts are obviously different. Assume that the user writes from left to right, and the time T is 0.5 seconds, which is divided into five time zones. Each time zone is 0.1 seconds, and the time zones are set for the controller to perform the guidance of the pencraft in the time zones respectively, but the number of time zones are not limited to five. In the first time zone and the fourth time zone, the nib is subjected to a greater resistance (such as −4 and −6) on the X-axis, so that the movement becomes slower, and the word becomes thicker. In the third time zone and the fifth time zone, the nib is subjected to a greater thrust force (such as +8 and +10) on the X-axis, so that the movement becomes faster, and the word becomes thinner. Further, in the first time zone, the nib is subjected to an increasing thrust force on the −Z-axis (such as −3) and moves downwardly. In the second time zone, the nib is not subjected to any thrust force (such as 0) on the Z-axis. In the third time zone, the nib is subjected to a thrust force (such as 1) on the +Z-axis, until the fourth time zone reaches a maximum value (such as +3) and thus generates characteristics. Finally, in the fifth time zone, the nib is subjected to a downward thrust force (such as −3). Further, in the first time zone, the nib is subjected to a downward thrust force (such as −2) on the −Y-axis toward the paper surface. In the second time zone, the nib is not subjected to any thrust force (such as 0) on the Y-axis. In the third time zone, the nib starts to move upwardly (such as +4) at the +Y-axis to make a thinner portion. In the fourth time zone, the nib moves downwardly to the paper surface (such as −6) to generate characteristics. In the fifth time zone, the nib moves upwardly (such as +6) to leave the paper surface.

Figure 7C:
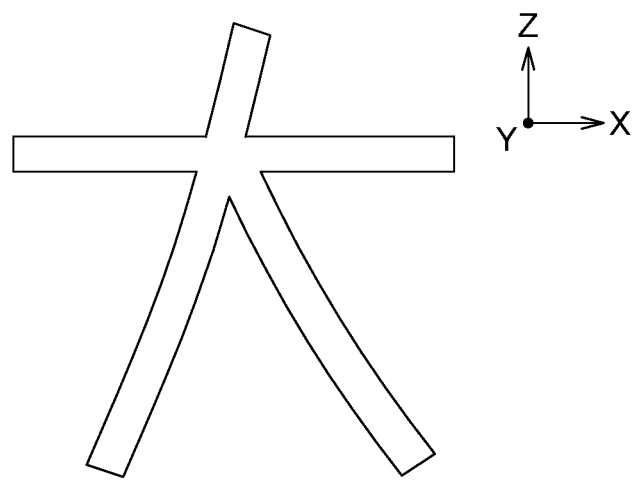
FIGS. 7C and 7D to 7G respectively shows the comparison between when the pen tube is not guided and when the pen tube is guided in the process of writing the word "ta(大)".
Figure 7D:
Figure 7E:
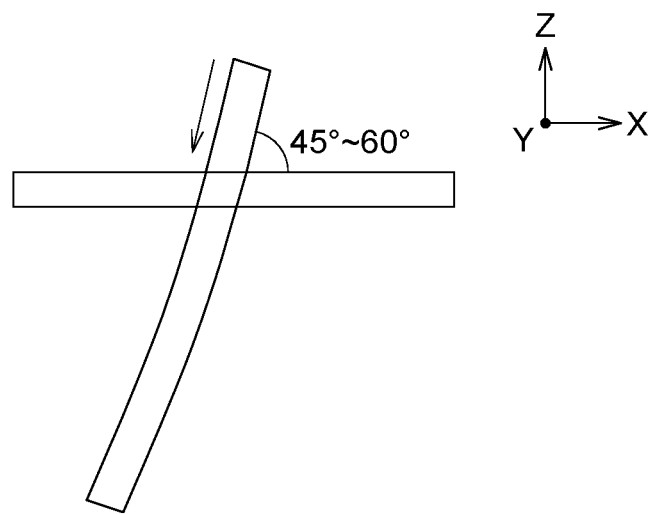
Figure 7F:
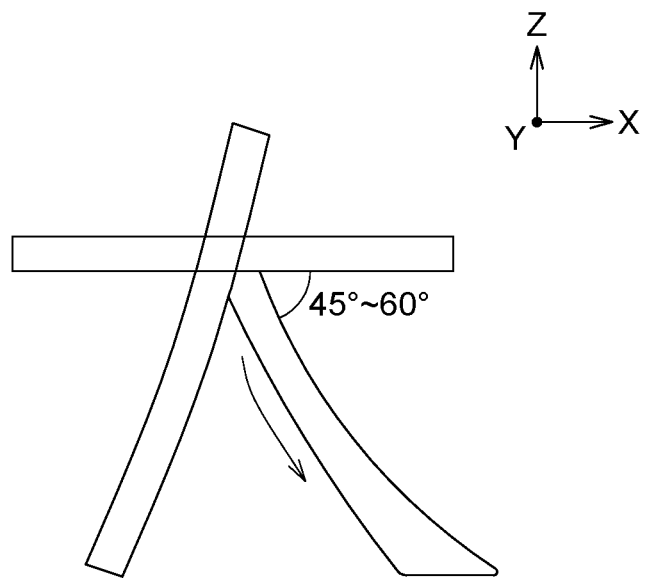
Figure 7G:
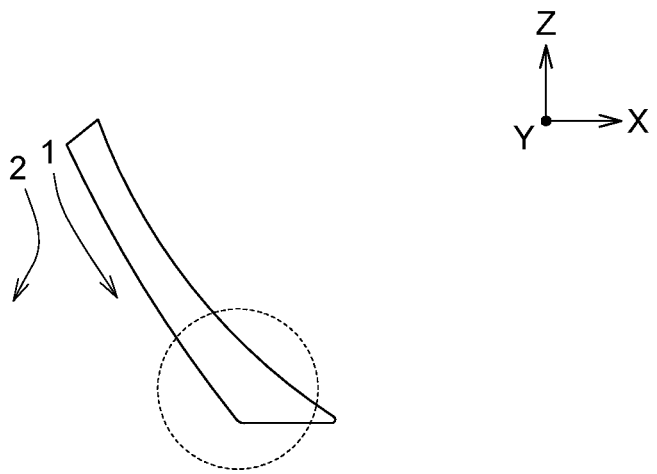
Figure 8A:
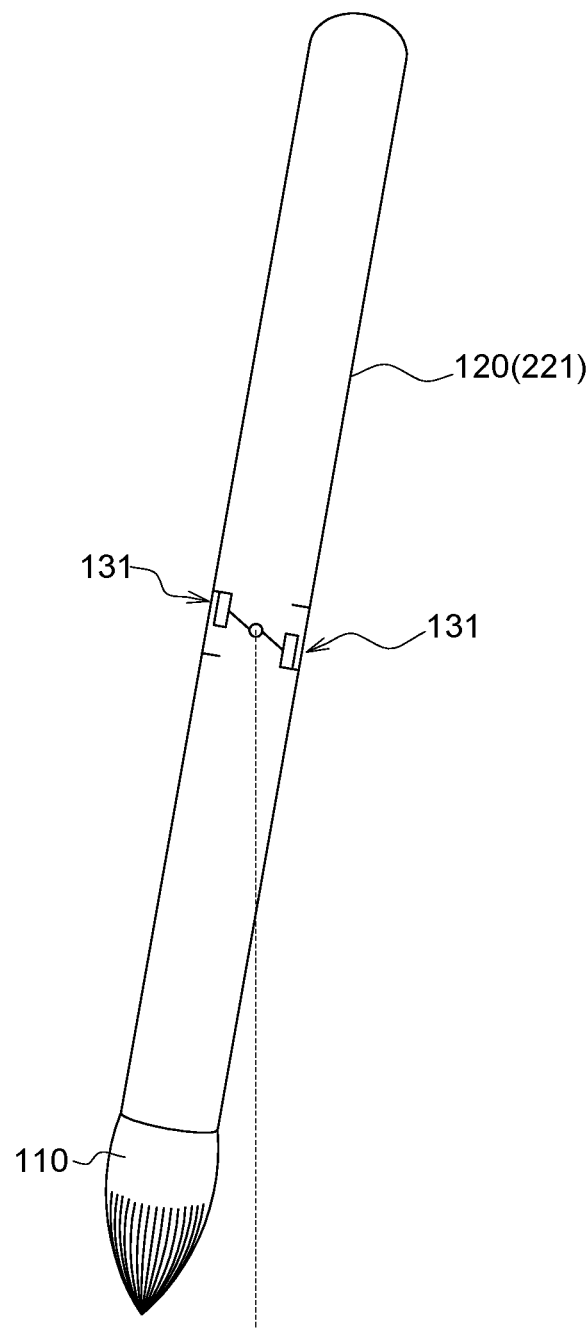
FIG. 8A and FIG. 8B show schematic diagrams of a writing implement generating a deviation or a displacement due to a rotation torque.
Figure 8B:
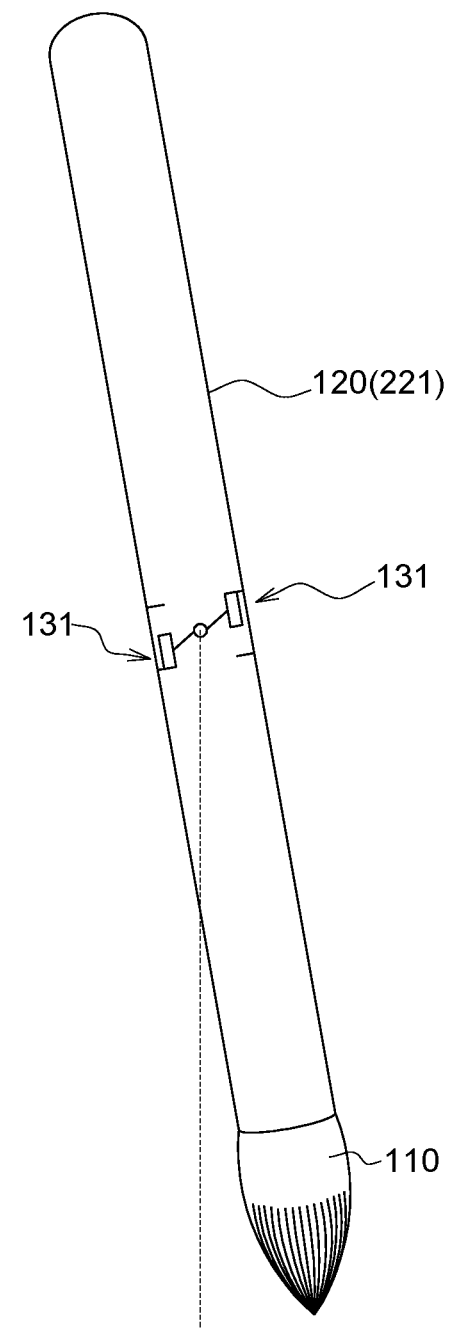

In addition, referring to FIG. 7C, in the process of writing, there is no change in thickness when writing the word "ta(大)" (transliteration of simplified Chinese) without being guided. In FIG. 7D, when guided by the writing implement 100, after writing the "horizontal" pencraft, the motion sensor 140 detects a displacement from the left to the right, and the controller 150 searches for all the words whose first stroke is "horizontal" pencraft from the copybook data storage unit D1. After that, in FIG. 7E, the motion sensor 140 detects a displacement and an angle (about 45 to 60 degrees) from the upper right to the lower left, which passes through the center of the first stroke, and the controller excludes the words whose second stroke is not "long left-falling". After that, in FIG. 7F, when the motion sensor 140 detects that the third stroke starts from the center of the first stroke and moves from the upper left to the lower right, the controller 150 once again excludes the words whose third stroke is not "right-falling". Or, when the written word is found out according to the context, and the word written by the user is finally determined to be most likely to the word "ta", the controller 150 starts to control the guiding element 130 to perform the guidance of pencraft characteristics according to the subsequent pencraft (as shown in path 1, if there is no resistance force generated, then continue to guide, if there is a resistance force generated, then continue to analyze), to generate, for example, the words and pencraft characteristics shown in FIG. 7B. In FIG. 7G, if the controller 150 determines that the subsequent stroke is moving toward path 2 (deviating from the guiding direction) instead of moving toward the guiding direction (path 1), the controller 150 may continue to analyze until the words prepared to be written by the user is determined.

Therefore, according to the above description, the user may copy or write the master's pencraft and pencraft characteristics under the guidance of the writing implement to show the master's style.

Figure 9:
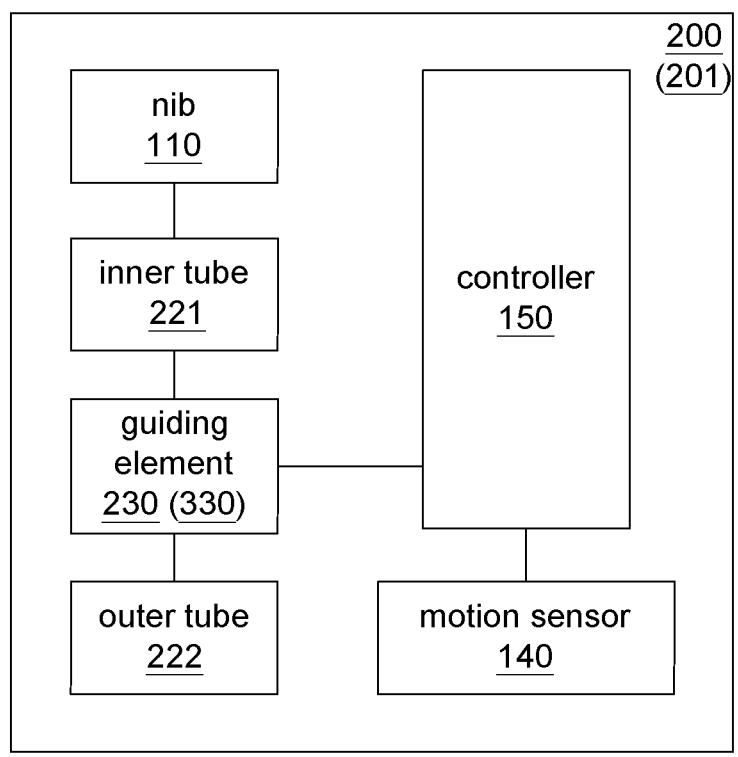
FIG. 9 shows a block diagram of a writing implement according to another embodiment of the present invention.
Figures 10A, 10B:
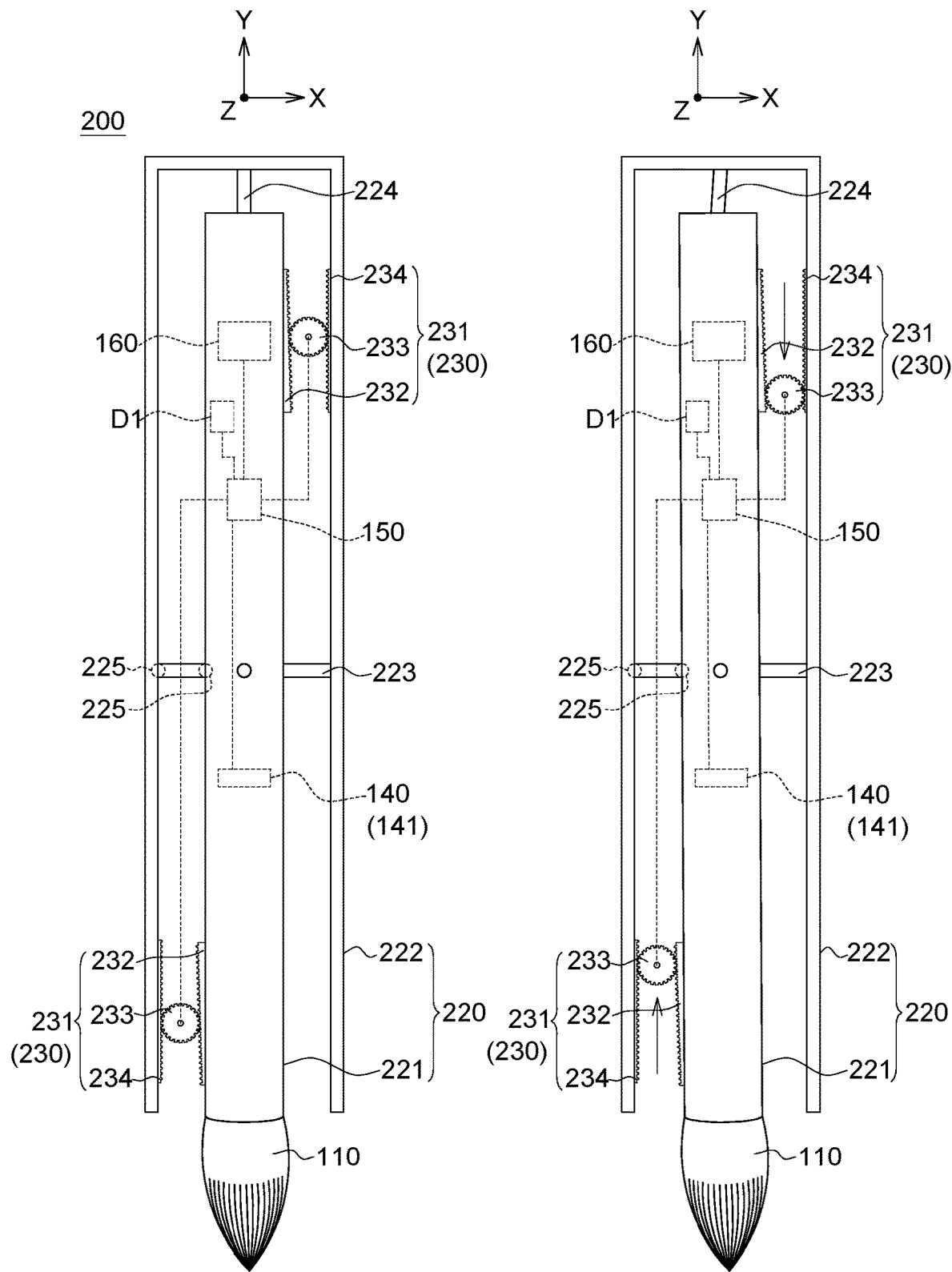
FIGS. 10A and 10B show schematic diagrams of a writing implement according to an embodiment of the present invention.

Referring to FIG. 9, FIG. 10A and FIG. 10B, a writing implement 200 according to another embodiment of the present invention includes a nib 110, an inner tube 221, an outer tube 222, a guiding element 230, a motion sensor 140 and a controller 150. The inner tube 221 in the present embodiment may be the pen tube 120 of the above embodiment, thus, the actuator 131 (hydraulic cylinder 132 and piston 133) in FIGS. 3A to 3C, and the servo motor 125 and the counter weight 126 of FIGS. 3D to 3E of the above embodiment may also be used together in the present embodiment. The functions and descriptions of the motion sensor 140 and the controller 150 are the same as those in the above embodiments, and will not be repeated here. In addition, the writing implement 200 of this embodiment may further be provided with a copybook data storage unit D1, a nib pressure sensor 142, and a signal transmitter 160. As described in the above embodiment, the details will not be repeated here.

Figure 11:
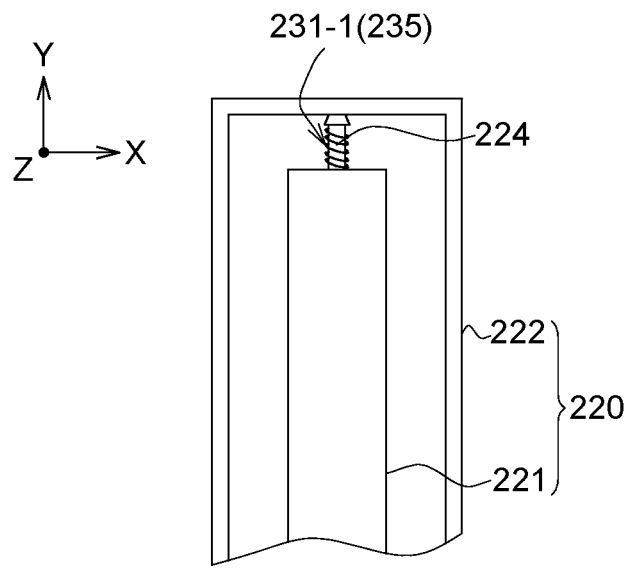
FIG. 11 shows a schematic diagram of an actuator provided on an axial supporting portion.
Figure 12:
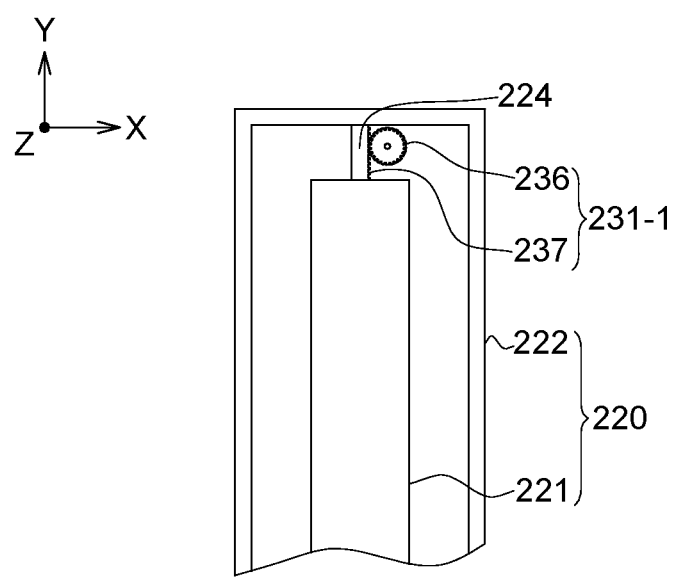
FIG. 12 shows a schematic diagram of another actuator provided on the axial supporting portion.

Referring to FIGS. 10A and 10B, the pen tube 220 includes an inner tube 221, an outer tube 222, and supporting portions 223 and 224. The supporting portion 223 may be located on the X-Z plane, and the supporting portion 224 may be located on the Y-axis. The supporting portions 223 and 224 are, for example, movable rods or telescoping rods, which are movably connected to the horizontal position and the vertical position between the inner tube 221 and the outer tube 222, and can be moved as the inner tube 221 tilts. When there is no mechanical force or torque, the supporting portions 223 and 224 support the inner tube 221, so that the inner tube 221 and the outer tube 222 can be maintained at a vertical position. In an embodiment, the end portion of the supporting portions 223 and 224 is, for example, a ball joint 225, which can be rotated with respect to the X-axis, the Y-axis, and the Z-axis. Further, the supporting portions 223 and 224 may also be controlled by the controller 150, so that the inner tube 221 moves in the X-axis, the Y-axis, and the Z-axis. Referring to FIG. 11 and FIG. 12, the guiding element further includes an actuator 231-1 provided on the supporting portion 224. The actuator 231-1 generates a guiding force by, for example, electromagnetic induction, hydraulic pressure, or pneumatic pressure, to drive the piston to move axially. Or, the actuator 231-1 generates the guiding force by the method of driving the screw rod 235 by the motor to move axially, and driving one of the gears 236 and rack 237 by the motor to move axially, so as to generate an axial displacement along the inner tube 221. The motor is for example provided on the inner wall of the outer tube 222, and the lead screw 235 is screwed between the motor and the inner tube 221, or the motor is provided on the inner tube 221 to drive the gear 236, and the gear 236 is engaged with the rack 237 and moves along the rack 237. In another embodiment, the above actuator 231-1 can also be provided between the inner tube 221 and the nib 110, so as to directly drive the nib 110 to move axially with respect to the inner tube 221.

The nib 110 is provided on the inner tube 221 and moves with the inner tube 221. For example, the inner tube 221 can be rotated around the X-axis and the Z-axis with respect to the outer tube 222, and the inner tube 221 can be moved along the Y-axis. The Y-axis is, for example, the long axis of the outer tube 222, and the X-axis, Y-axis, and Z-axis are perpendicular to each other. Under the movement of the inner tube 221, the nib 110 can be driven to perform writing.

Referring to FIGS. 10A and 10B, the guiding element 230 may include multiple actuators 231, provided in multiple orientations between the inner tube 221 and the outer tube 222. In the present embodiment, the number of the actuators 231 is described by taking eight as an example, but the actuators may also be less than four or more than eight, such as sixteen actuators. When the number of the actuator 231 is larger, the sensitivity of the guidance is higher. When there are two actuators 231, the two actuators are disposed in the diagonal direction of the pen tube 220 to hold the balance. As shown in FIG. 10A and FIG. 10B, the above multiple actuators 231 each includes an inclined rack 232 provided on the X-axis, an auxiliary rack 234 provided on the inner wall of the outer tube 222, and a driving wheel 233 (or other driving member capable of moving on the Y-axis) engaged between the inclined rack 232 and the auxiliary rack 234. The driving wheel 233 is controlled by the controller 150, to move the driving wheel 233 up and down along the Y-axis direction. Referring to FIG. 10A, when the driving wheel 233 is located at an initial position (for example, at a central tooth zone or a thin tooth zone of the inclined rack 232), the inner tube 221 is maintained at a vertical position. Referring to FIG. 10B, when the driving wheels 233 move up and down to the thick teeth zone of the inclined rack 232, respectively, the upper part of the inner tube 221 is moved toward the −X-axis, and the lower part of the inner tube 221 is moved toward the +X-axis. Then, the nib 110 can be controlled to write the pencraft characteristics related to the guidance in the X-axis, including guiding or prompting the user to write the pencraft characteristics of the middle or end of the pencraft, such as the "horizontal" pencraft in the Eight Principles of Yong, or other pencraft characteristics related to the guidance in the X-axis in other pencraft.

The multiple actuators 231 may further include an inclined rack 232, an auxiliary rack 234, and a driving wheel 233, which are arranged in the orientation of the Z-axis. Therefore, when the driving wheel 233 is moved downwardly to the thick teeth zone of the inclined rack 232, the upper part of the inner tube 221 is moved toward the −Z-axis, and the lower part of the inner tube 221 is moved toward the +Z-axis. Then, the nib 110 can be controlled to write the pencraft characteristics related to the guidance in the Z-axis, including guiding or prompting the user to write the pencraft characteristics of the middle or end of the pencraft, such as the "vertical" pencraft in the Eight Principles of Yong, or other pencraft characteristics related to the guidance in the Z-axis in other pencraft.

Furthermore, the above multiple actuators 231 may further include an inclined rack 232, an auxiliary rack 234, and a driving wheel 233, which are arranged in the orientation between the X-axis and the Z-axis. Therefore, the guiding element 230 in the present embodiment can control the nib 110 to write pencraft characteristics related to the corresponding orientations (for example, 45 degrees, 135 degrees, 225 degrees, and 315 degrees) by moving the driving wheels 233 in corresponding orientation. This includes guiding or prompting to write the pencraft characteristics of the middle or end of the pencrafts, such as "dot", "hook", "rising", "long left-falling", "short left falling" and "right left-falling" in the Eight Principles of Yong.

In the present embodiment, the above actuator 231 may also be an eccentric motor or an electromagnetic induction actuation element. Such as the above actuators 1311 to 1318, the actuator 231 is provided on the inner wall or the outer wall of the inner tube 221, to generate a guiding force. In addition, the above actuator 231 may also generate a force by means of piston driving, such as the actuator 131 described in FIG. 3A to FIG. 3C. The piston hits the upper plate 121 or the lower plate 122 provided on the inner wall or outer wall of the inner tube 221, and thus generates a force for tilting or displacing the inner tube 221 with respect to the supporting portion 223. In an embodiment, the user may perform the practice of pen-wielding and basic pencraft through the writing implement 200 of the present embodiment. The controller 150 may also control the writing direction of the nib 110 by itself without moving the hand, to achieve the purpose of auto-writing and demonstrating basic pencraft.

Figures 13A, 13B:
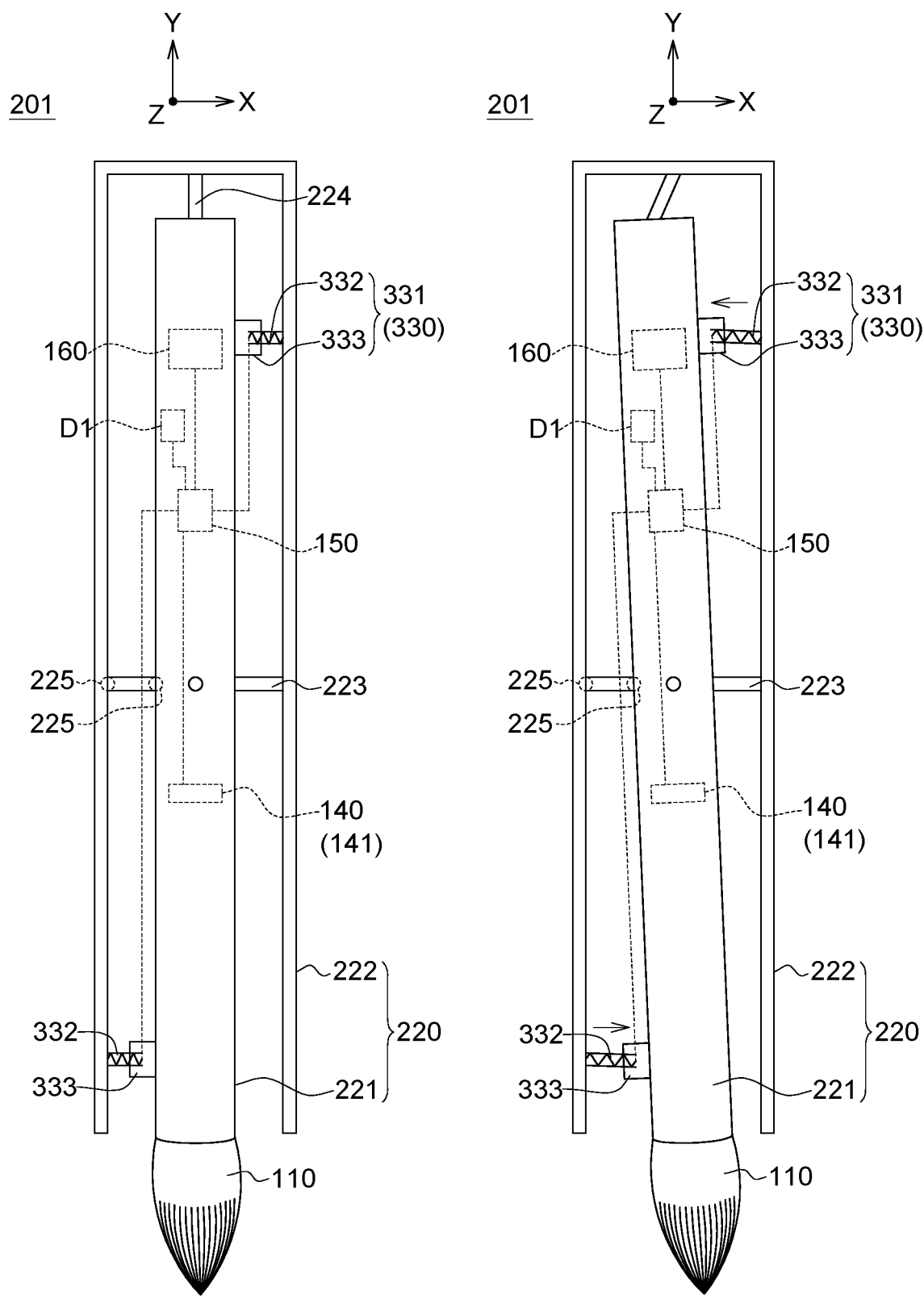
FIGS. 13A to 13B show schematic diagrams of a writing implement according to an embodiment of the present invention.

Referring to FIGS. 13A to 13B, in a writing implement 201 according to another embodiment of the present invention, the guiding element 330 may include multiple actuators 331, which are provided in multiple orientations between the inner tube 221 and the outer tube 222. In the present embodiment, the number of the actuators 331 is described by taking eight as an example, but the actuators may also be less than four or more than eight, such as sixteen actuators. When the number of the actuator 331 is larger, the sensitivity of the guidance is higher. The above multiple actuators 331 include a driving member 333 provided in the X-axis, and a force resilience member 332 provided between the driving member 333 and an inner wall of the outer tube 222. The driving member 333 is controlled by the controller 150, so that the driving member 333 can be moved along the X-axis. The force resilience member 332 is used to pull the driving member 333 back to the initial position. In an embodiment, the force resilience member 332 is composed of, for example, a tension spring, a hydraulic cylinder, a telescoping rod, or a micro-electromechanical mechanism. Referring to FIG. 13A, when the driving member 333 is in the initial position, the inner tube 221 maintains vertical position. Referring to FIG. 13B, when the driving member 333 is moved to the left and right, respectively, the upper part of the inner tube 221 is moved toward the −X-axis, and the lower part of the inner tube 221 is moved toward the +X-axis. Then, the nib 110 can be controlled to write the pencraft characteristics related to the guidance in the X-axis, including guiding or prompting the user to write the pencraft characteristics of the middle or end of the pencraft, such as the "horizontal" pencraft in the Eight Principles of Yong, or other pencraft characteristics related to the guidance in the X-axis in other pencraft.

The above multiple actuators 331 may further include a driving member 333 and a force resilience member 332 which are arranged in an orientation of the Z-axis direction. Therefore, when the driving member 333 is moved in the Z-axis direction, the upper part of the inner tube 221 is moved toward the −Z-axis, and the lower part of the inner tube 221 is moved toward the +Z-axis. Then, the nib 110 can be controlled to write the pencraft characteristics related to the guidance in the Y-axis, including guiding or prompting the user to write the pencraft characteristics of the middle or end of the pencraft, such as the "vertical" pencraft in the Eight Principles of Yong, or other pencraft characteristics related to the guidance in the Z-axis in other pencraft.

In addition, the above multiple actuators 331 may further include a driving member 333 and a force resilience member 332 arranged in the orientation between the X-axis and the Z-axis. Therefore, the guiding element 330 of the present embodiment may control the nib 110 to write the pencraft characteristics related to the corresponding orientations (for example, 45 degrees, 135 degrees, 225 degrees, and 315 degrees) by moving the driving member 333 in corresponding orientation. This includes guiding or prompting to write the pencraft characteristics of the middle or end of the pencraft, such as "dot", "hook", "rising", "long left-falling", "short left falling" and "right left-falling" in the Eight Principles of Yong.

In the present embodiment, the above actuator 331 may also be an eccentric motor or an electromagnetic induction actuation element. Such as the above actuators 1311 to 1318, the actuator 331 is provided on the inner wall or the outer wall of the inner tube 221, to generate a guiding force. In addition, the above actuator 331 may also generate a force by means of piston driving, such as the actuator 131 described in FIG. 3A to FIG. 3C. The piston hits the upper plate 121 or the lower plate 122 provided on the inner wall or outer wall of the inner tube 221, and thus generates a force for tilting or displacing the inner tube 221 with respect to the supporting portion 223. In an embodiment, the user may perform the practice of pen-wielding and basic pencraft through the writing implement 201 of the present embodiment. The controller 150 may also control the writing direction of the nib 110 by itself without moving the hand, to achieve the purpose of writing and demonstrating basic pencraft.

In summary, the writing implement according to the above embodiments of the present invention may provide a directional guidance in the process of writing, to write the pencraft characteristics corresponding to the guiding direction. In the writing implement according to the embodiment of the present invention, in the process of writing, the pencraft of the nib and/or the sequence of wielding the pen can be analyzed. Therefore, the writing implement can train the user to copy the master's handwriting, or guide the user to wield the pen according to the basic pencraft, to control the nib to write the pencraft characteristics related to the guidance corresponding to the axis. When the writing error occurs, the nib may be guided by the resistance force generated by the feedback from the actuator and the flywheel, and then the writing direction or pencraft will be corrected, and thus the writing will be in the correct guiding direction. In this way, even beginners of hand writing can still write hand writing similar to the copybook of the master, which may increase public interest in hand writing and motivation for the public to write Chinese words.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A writing implement, comprising:
   a pen tube having an end portion provided with a nib;
   a guiding element;
   a motion sensor; and
   a controller, wherein the guiding element and the motion sensor are disposed on the pen tube, and the guiding element is controlled by the controller,
   in the process of writing, the motion sensor detects words and pencraft characteristics when a user holds the pen tube for writing, and transmits the words and pencraft characteristics to the controller, the controller performs a comparative analysis between words and pencraft characteristics prepared to be written and the words and pencraft characteristics when writing according to the words and pencraft characteristics prepared to be written, when the words and pencraft characteristics prepared to be written are different from the words and pencraft characteristics when writing, the controller controls the guiding element to generate a guiding force to guide the words and pencraft characteristics when writing, to approach or be equal to the words and pencraft characteristics prepared to be written.

2. The writing implement according to claim 1, wherein the controller comprises a copybook data storage unit for storing words and pencraft characteristics, wherein
   the user directly selects the words and pencraft characteristics prepared to be written from the copybook data storage unit;
   or, the controller detects the words and pencraft characteristics according to the motion sensor, and performs comparison with the words and pencraft characteristics stored in the copybook data storage unit, the user confirms the words and pencraft characteristics prepared to be written;
   or, according to a real time analysis of the words and pencraft characteristics detected by the controller according to the motion sensor, and after performing a real time comparison with the words and pencraft characteristics stored in the copybook data storage unit, the words and pencraft characteristics prepared to be written are automatically determined.

3. The writing implement according to claim 2, wherein the controller further comprises a signal transmitter for transmitting and receiving signals, the signal transmitter is provided on the pen tube, wherein the signal transmitter receives a voice signal of the words prepared to be written by the user or a wireless signal transmitted by a mobile phone and a computer, and the words and pencraft characteristics prepared to be written is confirmed from the copybook data storage unit.

4. The writing implement according to claim 1, wherein the controller comprises a driving unit and an analysis unit, the driving unit controls the guiding element and is provided on the pen tube, and the analysis unit performs the comparative analysis between the words and pencraft characteristics prepared to be written and the words and pencraft characteristics when writing, the analysis unit is set on a mobile phone, a computer, a data cloud, and performs data calculation wirelessly, or the analysis unit is disposed on the pen tube.

5. The writing implement according to claim 1, wherein the guiding element comprises a plurality of actuators, the actuators are disposed in a plurality of orientations of the pen tube, and the actuator generates the guiding force in at least one of the orientations according to a difference between the words and pencraft characteristics prepared to be written and the words and pencraft characteristics when writing.

6. The writing implement according to claim 5, wherein the guiding element further comprises a flywheel provided on the pen tube, and the flywheel generates the guiding force in at least one of the orientations according to a difference between the words and pencraft characteristics prepared to be written and the words and pencraft characteristics when writing.

7. The writing implement according to claim 5, wherein the actuators are respectively connected to a central axis of the pen tube by a connecting rod, and hit an upper plate or a lower plate provided on an inner wall of the pen tube, to generate the guiding force of rotating the pen tube with respect to the central axis.

8. The writing implement according to claim 5, wherein the actuator comprises a servo motor and a plurality of counter weights, the servo motor is located on a central axis of the pen tube, the plurality of counter weights are connected to the servo motor by a connecting rod, respectively, the servo motor drives a rotation of the counter weight, and hit an upper plate or a lower plate disposed on an inner wall of the pen tube, to generate the guiding force of rotating the pen tube with respect to the central axis.

9. The writing implement according to claim 1, wherein the pen tube comprises an inner tube, an outer tube, and a supporting portion, the supporting portion is movably connected between the inner tube and the outer tube, and the inner tube generates the guiding force that inclines or displaces the inner tube under the driving of the guiding element, and the supporting portion is movably connected to the horizontal position and the vertical position between the inner tube and the outer tube, and is displaced as the inner tube is tilted.

10. The writing implement according to claim 9, wherein the guiding element comprises a plurality of actuators, and the actuator generates the guiding force in at least one orientation according to a difference between the words and pencraft characteristics prepared to be written and the words and pencraft characteristics when writing.

11. The writing implement according to claim 10, wherein the actuator comprises an inclined rack in the at least one orientation disposed between the inner tube and the outer tube, an auxiliary rack disposed on an inner wall of the outer tube, and a driving wheel engaged between the inclined rack and the auxiliary rack, the driving wheel is controlled by the controller to move along an axis of the inner tube from a thin teeth zone to a thick teeth zone of the inclined rack, and radially moves the inner tube, so that the inner tube is driven by the guiding force to generate a deviation or displacement.

12. The writing implement according to claim 10, wherein the actuator comprises a driving member disposed in the at least one orientation between the inner tube and the outer tube, and a force resilience member provided between the driving member and an inner wall of the outer tube, the driving member is controlled by the controller, and radially moves the inner tube, so that the inner tube is driven by the guiding force to generate a deviation or displacement.

13. The writing implement according to claim 10, wherein the actuator is provided on the inner tube, the actuators are respectively connected to a central axis of the inner tube by a connecting rod, and the actuator hits an upper plate or a lower plate disposed on an inner wall of the inner tube, to generate the guiding force of rotating the inner tube with respect to the central axis.

14. The writing implement according to claim 13, wherein the guiding force generated by the actuator provided on the inner tube corresponds to the guidance of a bigger pencraft characteristic, and the guiding force generated by the another actuator provided between the inner tube and the outer tube corresponds to a smaller pencraft characteristic.

15. The writing implement according to claim 10, wherein the guiding element comprises an actuator provided on the supporting portion in a vertical position, and the actuator generates the guiding force by means of electromagnetic induction, hydraulic pressure, or pneumatic pressure to drive a piston to move axially, or generates the guiding force by means of a motor driving a screw rod to move axially, or the motor driving one of a gear and a rack to move axially.

16. The writing implement according to claim 10, wherein the guiding element comprises an actuator connected between the inner tube and the nib, and the actuator generates the guiding force by means of electromagnetic induction, hydraulic pressure, or pneumatic pressure to drive a piston to move axially, or generates the guiding force by means of a motor driving a screw rod to move axially, or the motor driving one of a gear and a rack to move axially.

17. The writing implement according to claim 1, wherein the motion sensor comprises a nib pressure sensor provided within the nib to detect a deformation amount of the nib being pressed down, wherein the controller detects a pressure of the nib being pressed down according to a feedback signal of the nib pressure sensor, to determine the words and pencraft characteristics when writing.

18. The writing implement according to claim 1, wherein the motion sensor comprises a gyroscope or a gravity sensor, and is used to detect at least one of a displacement amount, an orientation angle, and a moving velocity of the pen tube.

* * * * *